No. 889,225. PATENTED JUNE 2, 1908.
G. W. HAAS.
LINEAR CONTOUR MEASURE.
APPLICATION FILED NOV. 25, 1907.
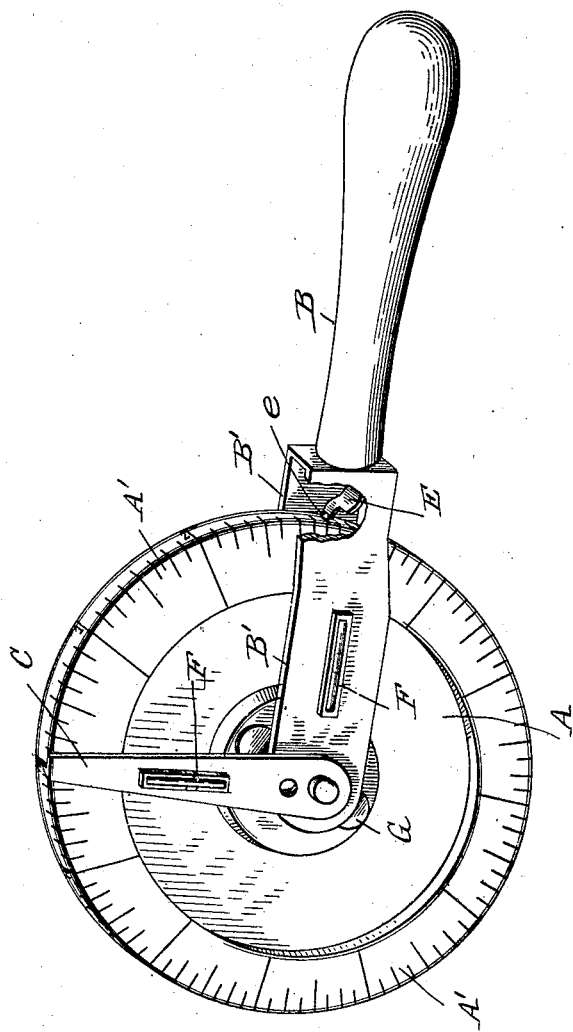
Witnesses
Melville W. Church
Elizabeth Griffith
Inventor
Gustave W. Haas
By Church & Church
his Attorneys

UNITED STATES PATENT OFFICE.

GUSTAVE W. HAAS, OF LOS ANGELES, CALIFORNIA, ASSIGNOR OF ONE-HALF TO MARGARET B. FOWLER, OF PASADENA, CALIFORNIA.

LINEAR CONTOUR MEASURE.

No. 889,225.　　　Specification of Letters Patent.　　　Patented June 2, 1908.

Application filed November 25, 1907. Serial No. 403,733.

*To all whom it may concern:*

Be it known that I, GUSTAVE W. HAAS, of Los Angeles, in the county of Los Angeles, State of California, have invented a certain new and useful Improvement in Linear Contour Measures; and I do hereby declare the following to be a full, clear, and exact description of the same, reference being had to the accompanying drawings, forming a part of this specification, and to the figures and letters of reference marked thereon.

This invention relates to devices for measuring the surface distance around, or between, given points on an irregular body, the particular object of the invention being to provide a device adapted for use by the medical profession in making records of deformities of the human body, in order to note the effect of remedial operations or with a view to arriving at a proper course of remedial treatment.

The accompanying drawing is a perspective view of a measuring device embodying the present invention with a portion broken away to show the spring stop for indicating when the pointer is at zero.

The simple embodiment of the invention illustrated comprises a wheel A of proper diameter to follow the irregularities of the surface to be measured and as it is adapted to be used on the bare skin of the patient it is preferably made of a non-heat conducting material. The wheel is of light weight, turns freely so as to measure accurately the surface of soft portions of the anatomy but at the same time it is sufficiently retarded by frictional resistance to insure its motion being arrested the instant it leaves the surface being measured. The wheel is graduated on the periphery and preferably also on each side of the rim as at A'. As shown the graduations are in inches and fractions thereof.

A handle B having a fork with flat arms B' between which the wheel is journaled serves as a convenient means for handling the device and while the edge of one or both forks may serve as the pointer with which the graduations register, it is preferred to provide a separate arm C to serve as the pointer. This arm is mounted on but arranged at right angles to the fork and handle and in order that the users may know when the pointer is at zero a light spring stop E is mounted on the handle between the forks in position for its end to engage lightly with a projection *e* on the wheel.

Obviously in making a measurement with the instrument, the length of the spinal column, for instance, any angular shifting of the handle and pointer will give rise to a variation in the indication, and in order to insure an accurate reading I mount on the handle and preferably also on the pointer arm a leveling device or devices. As shown, ordinary spirit levels F are arranged at right angles to each other on the handle and pointer arm respectively. Either or both may be used to indicate a position for the handle and pointer at the start and conclusion of the traverse of the wheel. The levels enable the position of the handle and pointer with relation to the horizon to be determined and if this relation be preserved at the conclusion of the traverse the pointer will indicate accurately the surface traversed by the wheel.

For checking the too free rotation of the wheel, light friction springs G are interposed between the forks and hub of the wheel, but it is obvious that other well known frictional braking means may be employed as well as other well known leveling means, without departing from the present invention.

What I claim as new and desire to secure by Letters Patent, is:

In a linear contour measure, the combination with the graduated surface traversing wheel, the handle and the pointer for registering with the graduations arranged at right angles to each other, of levels connected with said handle and pointer and arranged at right angles to each other for indicating the proper position of the pointer at the beginning and end of a traverse.

GUSTAVE W. HAAS.

Witnesses:
FLORENCE EVERIL YUNGE,
J. W. HUDSON.